«12» United States Patent
Cai et al.

(10) Patent No.: US 7,856,551 B2
(45) Date of Patent: Dec. 21, 2010

(54) DYNAMICALLY DISCOVERING A SYSTEM TOPOLOGY

(75) Inventors: Xiaohua Cai, Shanghai (CN); Yufu Li, Shanghai (CN); Murugasamy Nachimuthu, Hillsboro, OR (US); Rahul Khanna, Portland, OR (US); Koo Heng Daniel AW, Cupertino, CA (US); Wenson Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 11/810,434

(22) Filed: Jun. 5, 2007

(65) Prior Publication Data

US 2008/0307082 A1 Dec. 11, 2008

(51) Int. Cl.
*G06F 9/00* (2006.01)
(52) U.S. Cl. ............................................. 713/1; 713/2
(58) Field of Classification Search ............. 713/1, 713/2
See application file for complete search history.

(56) References Cited

U.S. PATENT DOCUMENTS

| 6,009,488 | A | 12/1999 | Kavipurapu | 710/105 |
|---|---|---|---|---|
| 7,080,242 | B2 * | 7/2006 | Morris | 713/1 |
| 7,158,486 | B2 * | 1/2007 | Rhodes | 370/256 |
| 7,349,991 | B2 * | 3/2008 | Khanna et al. | 709/248 |
| 7,716,409 | B2 * | 5/2010 | Hum et al. | 710/305 |
| 2003/0093510 | A1 * | 5/2003 | Cen | 709/223 |
| 2007/0002869 | A1 * | 1/2007 | Miller | 370/395.32 |
| 2008/0162873 | A1 * | 7/2008 | Zimmer et al. | 712/22 |
| 2008/0244256 | A1 * | 10/2008 | Cai et al. | 713/2 |

* cited by examiner

*Primary Examiner*—Chun Cao
(74) *Attorney, Agent, or Firm*—Trop, Pruner & Hu, P.C.

(57) ABSTRACT

In one embodiment, the present invention includes a method for dynamically discovering a topology of a system having a plurality of point-to-point (PTP) links via a routine that communicates a link exchanged parameter with at least one component coupled to a system bootstrap processor (SBSP), sets a minimal set of routing infrastructure information based on the communication, and determines presence of a neighboring component to a target component based on a communication from the SBSP to the target component using the minimal set of routing infrastructure information. Other embodiments are described and claimed.

17 Claims, 4 Drawing Sheets

DYNAMICALLY DISCOVERING A SYSTEM TOPOLOGY

BACKGROUND

Topology data of a system such as a multiprocessor system is needed for system initialization, based on which the system routing infrastructure can be computed and configured correctly. However, before setting the system routing, components in the system cannot communicate with each other freely, thus none of them can collect the entire topology information directly. This causes a contradiction. To solve this problem, some systems use a hardware capability for a processor component to find out its immediate neighboring components. For example, a system service processor (SSP), which is a special processor that communicates using a low speed out-of-band channel (e.g., an Inter-Integrated Circuit ($I^2C$) link) may communicate with other components of the system to determine topology.

Due to the complexity of some topologies, it can be highly time consuming for the SSP to set up the entire system routing directly. Accordingly, other systems require storing a massive amount of pre-computed data corresponding to routing information in Basic Input Output System (BIOS). For example, in a system with ten point-to-point (PTP) links, a maximum of 1024 topologies can exist. To store pre-computed data for all the possible topologies requires kilobytes, which is very expensive for BIOS flash storage.

DETAILED DESCRIPTION

Figure 1:
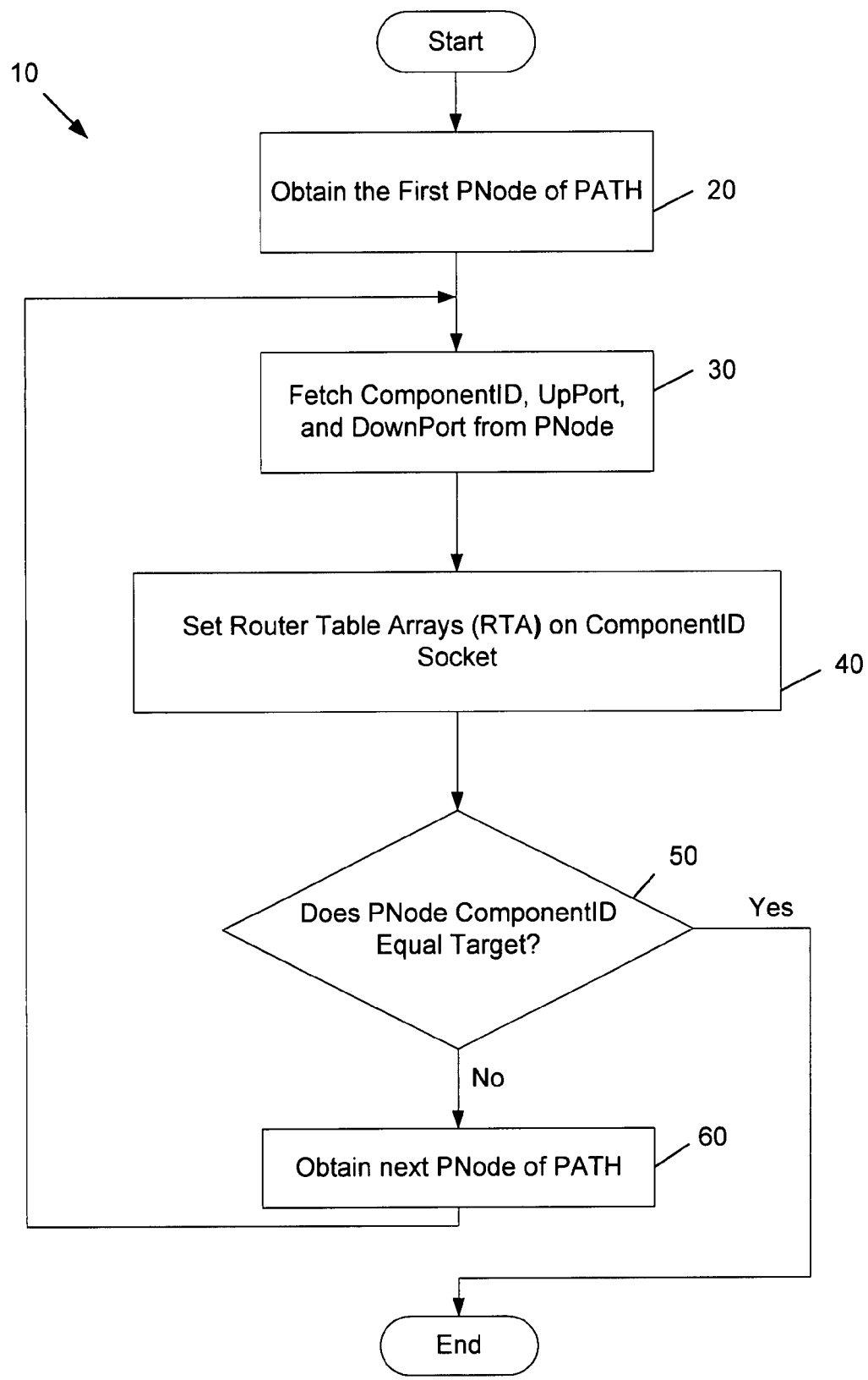
FIG. 1 is a flow diagram of a method in accordance with one embodiment of the present invention.

In various embodiments, the topology of a link-based system can be discovered by BIOS dynamically. More specifically, embodiments may discover the topology along with the setting of the minimal routing infrastructure so that it needs neither out-of-band assistance from a SSP nor pre-computed data embedded in BIOS.

By setting a minimal set of routing infrastructure from itself to the discovered components, a processor, such as a system bootstrap processor (SBSP) which is the active processor to execute the topology discovery procedure can access the discovered components to find out their neighboring components. Repeating this process, the whole system can be discovered finally. Compared to other possible methods which require either significant assistance from a SSP or massive amounts of pre-computed topology data stored in BIOS, the dynamic discovery process provides in-band advantages. Moreover, embodiments may be generic to gather the topology information, so it is adaptive regardless of the topology complexity. The same method is used even if the topology changes at runtime, such as in link errors and hot-plug cases. Since this mechanism allows the BIOS to initialize the links and router setup, this allows the BIOS to perform the hot plug and reliability availability and serviceability (RAS) events without external dependency.

In one embodiment, a system may be according to a PTP protocol such as a common system interface (CSI) protocol, although the scope of the present invention is not limited in this regard. In such a system, inter-processor and processor-hub communications are performed using packets. Identifiers of both source and destination (e.g., named as NodeID) are encoded in the packets to direct the communication flows. Generally, the packets are routed based on destination NodeID's. Each of the components may include a set of router table arrays (RTAs), which provides routing information for routing a packet to other agents. In each processor, the RTAs may be implemented in hardware called a router which supports multiple ports. There can be many RTA entries in each port. Each RTA entry associates a destination NodeID to a set of output ports. Packets for each destination NodeID could be routed to a single output port or multiple output ports. After configuring the RTA of a port, a processor core can route packets to its immediate neighboring components. Once the RTAs of the remaining ports of the processor have been configured, other components in the system could communicate with it, and vice versa.

During link hardware initialization, the connected components on both ends of a PTP link will exchange messages to inform each other with their identity, port number, and capabilities. Such information is called a link exchanged parameter, which is stored in a storage such as a register of the components. The SBSP can find out whether an immediate neighboring component exists or not through its own link exchanged parameter. However, the SBSP cannot identify the rest of the system components without proper RTA programming.

By setting a minimal set of routing infrastructure, the SBSP can then communicate with the new discovered components to access their link exchanged parameters for finding their neighbors. This minimal set of routing infrastructure only consists of RTA entries of related ports on the paths between SBSP and the new discovered components. The forward path allows the SBSP to access the new discovered component and backward path enables the accessed data to return. A path node (PNode) is each component on the path; a Target is the new discovered component; on each PNode, the Up Port is the related port closer to the SBSP and Down Port is the related port closer to the Target. Then the path can be represented as a series of Path Nodes, which is a triple tuple of {Component ID, Up Port, Down Port}.

Executing the two steps above in an iterative manner, the entire system topology can be discovered eventually. A discovery tree with the SBSP as the root can be built. Going from the tree root node to a tree target node, the Tree Path from SBSP to target can be identified. The tree path can be translated into a series of PNodes for setting the minimal set of routing infrastructure.

The final discovered topology can be stored in any desired format with additional details. At least, it may contain all the components of the system, as well as other components that are directly connected to each of them. Meanwhile, if there is a connection between two components, the component distance between them is one; whereas other distances are unknown but can be easily deduced from the discovered topology. Table 5 lists the pseudo-code of the main discovery sequence according to one implementation.

Referring now to FIG. 1, shown is a flow diagram of a method in accordance with one embodiment of the present invention. More specifically, method 10 may be used to set minimal routing infrastructure information from an SBSP to a target component. As shown in FIG. 1, method 10 may begin by getting a first path node (PNode) of a path input parameter, where the path is a list of path nodes (block 20). Note that method 10 may be part of an overall dynamic topology discovery and may be performed to obtain and set minimal communication infrastructure information from the SBSP to a target using a tree path of a discovery tree, where the tree path is translated to a path that includes a series of path nodes. Next, certain information from the path node may be fetched, namely a component identifier and up and down port identifiers (ComponentID, UpPort and DownPort) (block 30). Using this information, RTAs on the socket corresponding to the component ID may be set (block 40). More specifically, the RTA entry for the SBSP on the down-port may be set to route to the up-port, while the RTA entry associated with the target component may have its up-port set to route to the down-port. Then it may be determined whether the path node component identifier corresponds to the target identifier (diamond 50), if so, method 10 may conclude, otherwise the next path node of the path may be obtained at block 60, and control passes back to block 30.

Figure 2:
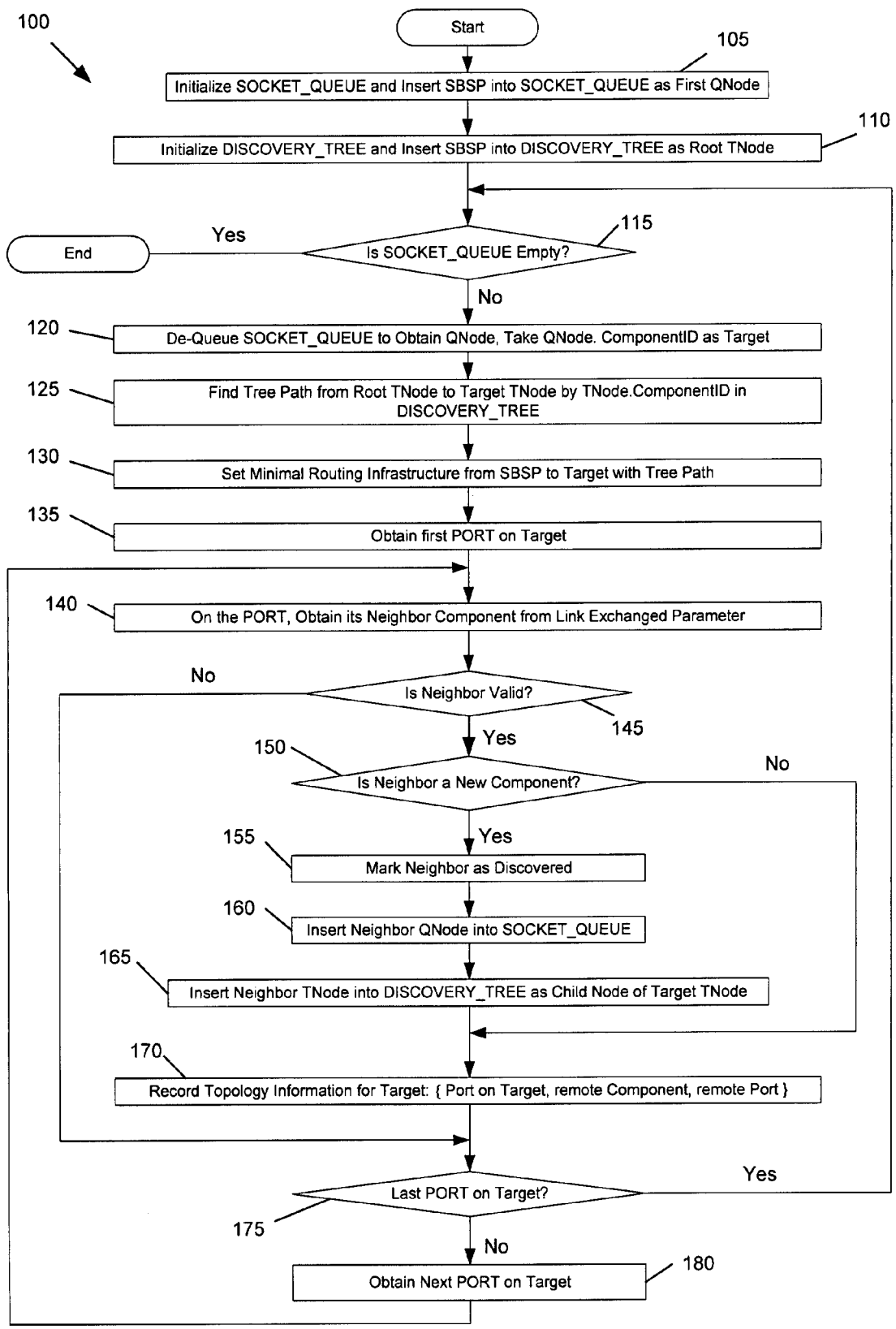
FIG. 2 is a flow diagram of a method in accordance with an embodiment of the present invention.

Referring now to FIG. 2, shown is a flow diagram of a method in accordance with an embodiment of the present invention. More specifically, method 100 shows an overall flow diagram for dynamic topology discovery in accordance with an embodiment of the present invention. As shown in FIG. 2, method 100 begins by initializing a socket queue that is used for discovery order by inserting the SBSP into the socket queue as the first queue node (block 105). Note that each queue node (QNode) includes a component identifier. Next at block 110, a discovery tree is initialized by inserting the SBSP into the discovery tree as the root tree node (Root TNode). The discovery tree may be used to find the tree path, where each tree node (TNode) includes a component identifier, a component up-port identifier, a parent identifier and a parent down-port identifier.

Referring still to FIG. 2, next it may be determined whether the socket queue is empty (diamond 115). If so, method 100 may conclude. Otherwise control passes to block 120. At block 120 the socket queue may be de-queued to obtain a QNode by taking the component ID associated with the QNode as the target. Block 120 may be thus used to determine a discovered order. Next, a tree path may be found from the Root TNode to the Target TNode by using the TNode component identifier in the discovery tree (block 125). Next, the minimal routing infrastructure information from the SBSP to the target with the tree path may be performed at block 130. Note that in various embodiments, this process may be performed in accordance with method 10 of FIG. 1. Note that blocks 125 and 130 may be used to set the routing infrastructure to build an access path from the SBSP to a target component.

Referring still to FIG. 2, next a first port on the target may be obtained (block 135). On this port, its neighbor component may be obtained from the link exchanged parameter (block 140). Then it may be determined whether the neighbor is valid at diamond 145. If not, control passes to diamond 175, discussed further below. If the neighbor is valid it may be determined whether the neighbor is a new component at diamond 150. If so control passes to block 155, otherwise control passes to block 170.

At block 155 the neighbor may be marked as discovered. Then the neighbor QNode may be inserted into the socket queue (block 160). Further the neighbor TNode may be inserted into the discovery tree as a child node of the Target TNode (block 165). Then at block 170 topology information for the target may be recorded. In various embodiments, the topology information may include the port on the target, the remote component and the remote port. In various embodiments, the topology information may be stored in various locations in a system, for example in a table within the SBSP, or another storage accessible by the SBSP. Control passes to diamond 175 where it may be determined whether the recorded port is the last port on the target. If so, control passes back to diamond 115. Otherwise control passes to block 180 where the next port on the target may be obtained and control passes back to block 140. Note that blocks 135-180 may thus be used to discover a target's neighbors by using link exchanged parameters. While shown with this particular implementation in the embodiment of FIG. 2, the scope of the present invention is not limited in this regard.

Referring now to Table 1, shown is a minimal set of routing infrastructure for an example coupling between an SBSP, an intermediate component, and a target component, where the SBSP includes a router having a port A coupled to an internal unit of the SBSP and a port B coupled by a PTP link to a port C of the intermediate component. In turn, port C of the intermediate component has a path set by its RTA to a port D of the intermediate component that in turn is coupled by a PTP to a port E of the target component. In turn, port E of the target component is coupled by a path set by its RTA to a port F of the target component that couples to an internal unit of the target component. Similar routing in the backward direction is also shown in Table 1.

TABLE 1

| Component | Port to Be Set | RTA Entry of Destination | Output Port | Direction |
|---|---|---|---|---|
| SBSP | Port#A | Response agent NodeID on Target | Port#B | Forward |
| | Port#B | SBSP NodeID | Port#A | Backward |
| Intermediate | Port#C | Response agent NodeID on Target | Port#D | Forward |
| | Port#D | SBSP NodeID | Port#C | Backward |
| Target | Port#E | Response agent NodeID on Target | Port#F | Forward |
| | Port#F | SBSP NodeID | Port#E | Backward |

Figure 3:
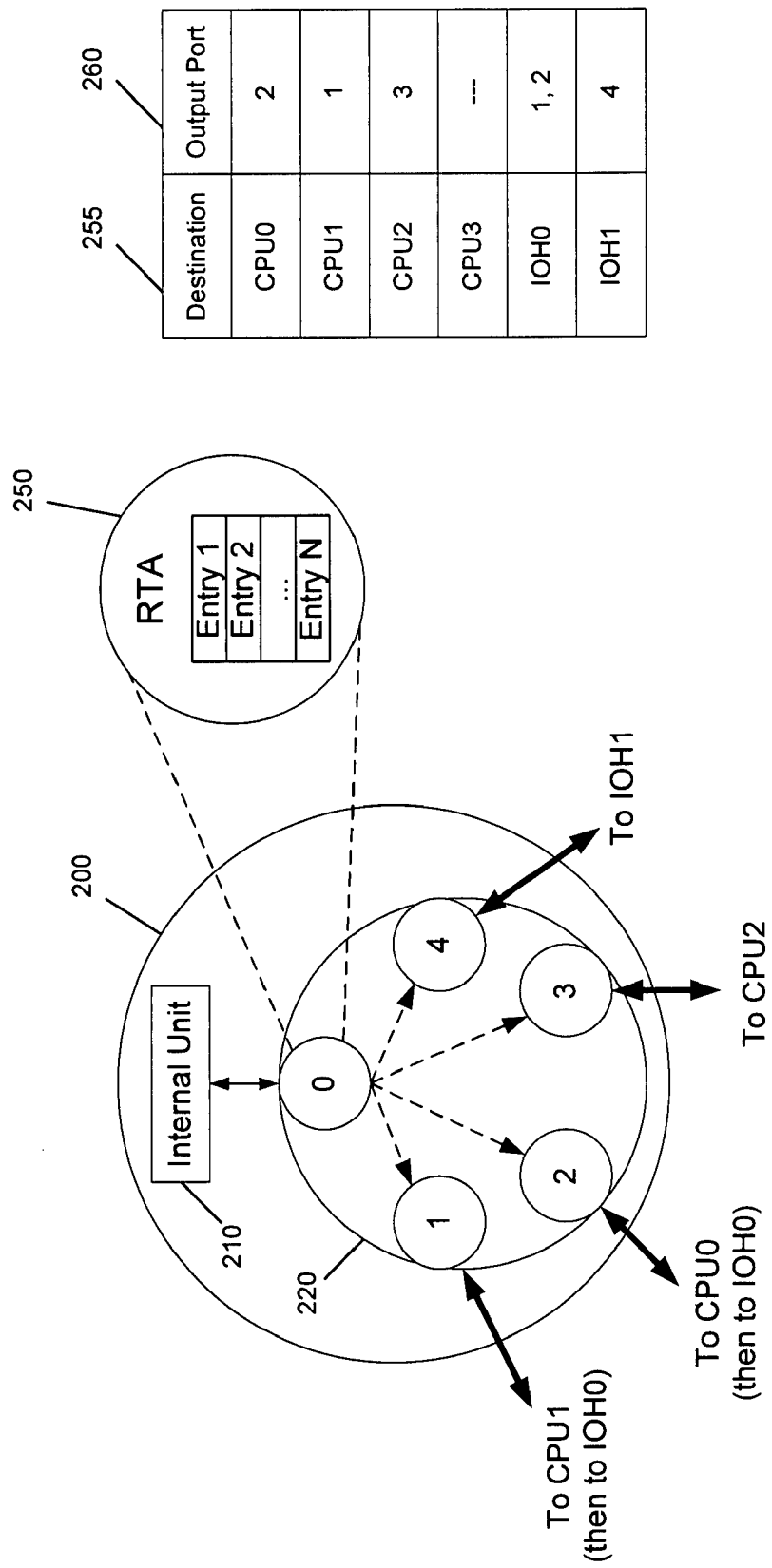
FIG. 3 is a block diagram of a component in accordance with one embodiment of the present invention.

Referring now to FIG. 3, shown is a block diagram of a component 200 having associated router information set forth in an RTA 250. As shown in FIG. 3, component 200, which may be a processor or other component, includes an internal unit 210, which may correspond to one or more cores of a processor. Component 200 further includes a router 220 including a plurality of ports 0-4. As shown in FIG. 3, each port is coupled to a given component, where the solid black lines indicate PTP links to other components and the dashed lines internal to router 220 indicate paths set by RTA 250. As shown, RTA 250 includes a plurality of entries where each entry includes a destination portion 255 and an output port portion 260. While shown with this particular implementation in the embodiment of FIG. 3, the scope of the present invention is not limited in this regard.

Figure 4:
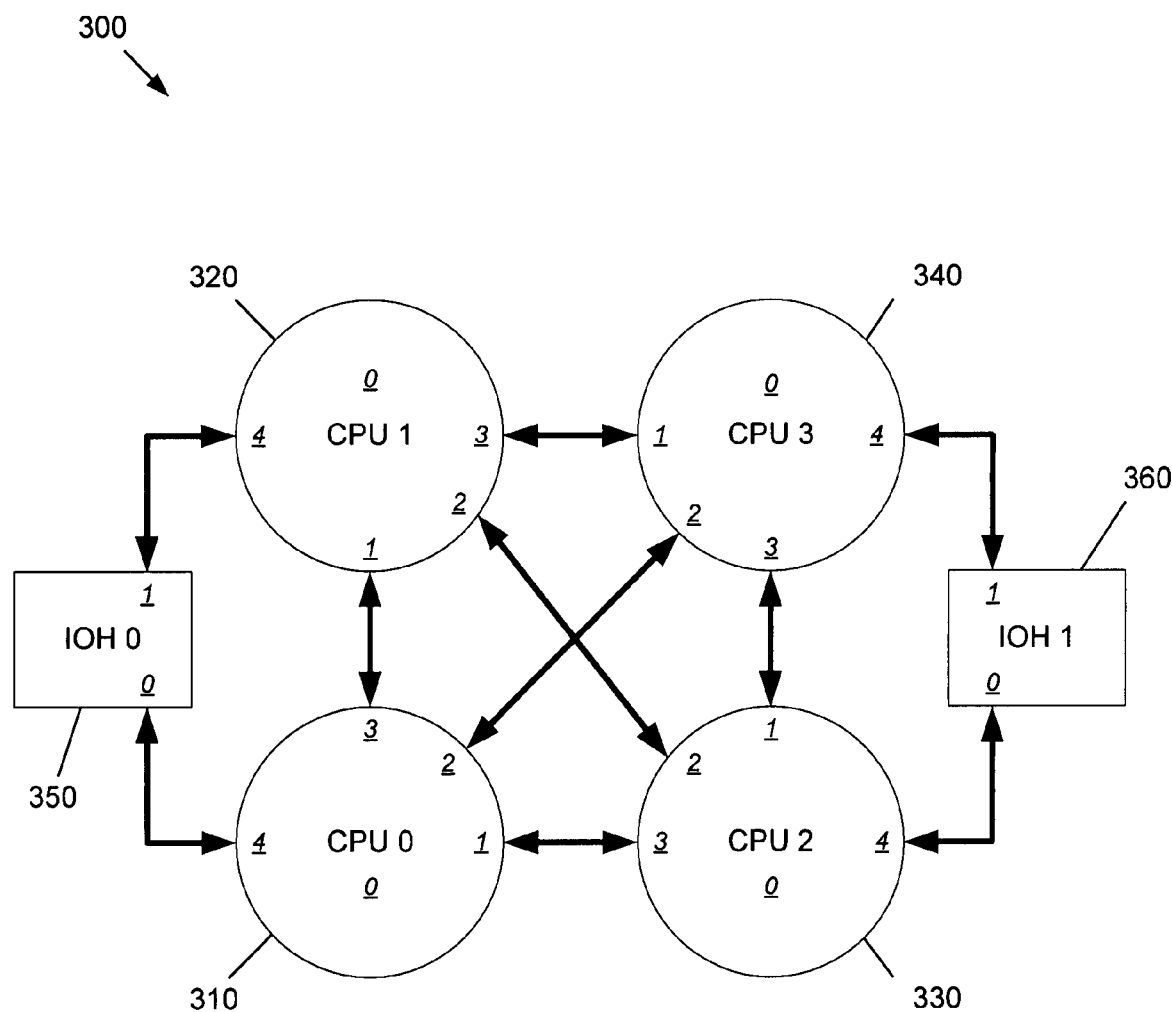
FIG. 4 is a block diagram of a system in accordance with an embodiment of the present invention.

Referring now to FIG. 4, shown is a block diagram of a system in accordance with an embodiment of the present invention. As shown in FIG. 4, system 300 includes a plurality of PTP links that couple together various components. Specifically, an SBSP 310 is coupled by various PTP links to processors 320, 330 and 340. Similarly, processors 310 and 320 are coupled to a first input/output hub (IOH) 350, while processors 330 and 340 are coupled to a second IOH 360. Of course, additional components such as various peripheral devices connected to the IOHs by any given type of connection may be present. Furthermore, portions of main memory may be locally coupled to each of processors 310-330. Note that in the embodiment of FIG. 4, each component includes a plurality of ports.

As shown in Table 2 below, shown is a discovery tree generated for the components of system 300.

TABLE 2

| Discovered Order | Component ID | ComponentUpPort | Parent ID | ParentDownPort |
|---|---|---|---|---|
| 1 | CPU0 (SBSP) | N/A | N/A | N/A |
| 2 | CPU2 | 3 | CPU0 | 1 |
| 3 | CPU3 | 2 | CPU0 | 2 |
| 4 | CPU1 | 1 | CPU0 | 3 |
| 5 | IOH0 | 0 | CPU0 | 4 |
| 6 | IOH1 | 0 | CPU2 | 4 |

Similarly, Tables 3 and 4 depict a discovered topology for system 300 that provide examples of the dynamic topology discovery results provided in accordance with an embodiment of the present invention. In Table 3 the numbers correspond to port numbers, and the components listed in the leftmost column are the originating components, while the components listed in the topmost row are the destination components. In Table 4 the numbers correspond to distance, and the components listed in the leftmost column are the originating components, while the components listed in the topmost row are the destination components. Note that in Tables 3 and 4, N/A corresponds to a don't care condition, while the asterisks refer to an unknown item.

TABLE 3

|  | CPU0 | CPU2 | CPU3 | CPU1 | IOH0 | IOH1 |
|---|---|---|---|---|---|---|
| CPU0 | n/a | 1 | 2 | 3 | 4 | * |
| CPU2 | 3 | n/a | 1 | 2 | * | 4 |
| CPU3 | 2 | 3 | n/a | 1 | * | 4 |
| CPU1 | 1 | 2 | 3 | n/a | 4 | * |
| IOH0 | 0 | * | * | 1 | n/a | * |
| IOH1 | * | 0 | 1 | * | * | n/a |

TABLE 4

|  | CPU0 | CPU2 | CPU3 | CPU1 | IOH0 | IOH1 |
|---|---|---|---|---|---|---|
| CPU0 | 0 | 1 | 1 | 1 | 1 | * |
| CPU2 | 1 | 0 | 1 | 1 | * | 1 |
| CPU3 | 1 | 1 | 0 | 1 | * | 1 |
| CPU1 | 1 | 1 | 1 | 0 | 1 | * |
| IOH0 | 1 | * | * | 1 | 0 | * |
| IOH1 | * | 1 | 1 | * | * | 0 |

TABLE 5

```
DynamicTopologyDiscovery ( )
{
    InitQueue (SOCKET_QUEUE);
    EnQueue (SOCKET_QUEUE, SBSP_QNode);
    InitTree (DISCOVERY_TREE);
    SBSP_TNode = AssembleTreeNode (SBSP_QNode);
    SetTreeRoot (DISCOVERY_TREE, SBSP_TNode);
    WHILE (!IsQueueEmpty (SOCKET_QUEUE)) {
        // find path and set minimal routings infrastructure from SBSP to a Target
        Target_QNode = DeQueue (SOCKET_QUEUE);
        Target_TNode = AssembleTreeNode (Target_QNode);
        TREE_PATH = FindTreePath (DISCOVERY_TREE, SBSP_TNode, Target_TNode);
        PATH = TranslateTreePath (TREE_PATH);
        SetMinimalRoutingInfrastructure (Target, PATH); // shown in FIG. 1
        // discover neighbors of Target
        PORT = FirstPort (Target);
        WHILE (IsPortValid (Target, PORT)) {
            Neighbor = GetNeighborByLinkExchangedParameter (Target, PORT);
            IF (!IsComponentValid (Neighbor))  {   CONTINUE;   }
            IF (IsNewFound (Neighbor)) {
                SetFoundFlag (Neighbor);
                EnQueue (SOCKET_QUEUE, Neighbor_QNode);
                Neighbor_TNode = AssambleTreeNode (Neighbor_QNode);
                InsertChildToParent (DISCOVERY_TREE, Neighbor_TNode,
Target_TNode);
            }
            RecordTopologyInfo (Target, PORT, Neighbor, Neighbor_TNode.ComponentUpPort);
            PORT = NextPort (Target, PORT);
        };
    };
}.
```

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
dynamically discovering a topology of a system having a plurality of point-to-point (PTP) links using basic input/output system (BIOS) via a routine comprising:
communicating a link exchanged parameter with at least one component coupled to a system bootstrap processor (SBSP) by a PTP link;
setting a minimal set of routing infrastructure information based on the communicating, wherein the minimal set of routing information infrastructure corresponds to entries of a router table array of ports of components between the SBSP and a target component on a path between the SBSP and the target component;
determining presence of one or more neighboring components to the target component based on a communication from the SBSP to the target component using the minimal set of routing infrastructure information; and
building a discovery tree using the SBSP, wherein the discovery tree includes a plurality of tree paths, each tree path including a series of path nodes from the SBSP to a target node, each path node including a tuple having a component identifier, an uplink port identifier, and a downlink port identifier.

2. The method of claim 1, wherein the link exchanged parameter includes a component identifier, a port number, and capabilities.

3. The method of claim 1, further comprising storing the discovery tree in a storage accessible by the SBSP.

4. The method of claim 1, further comprising setting the router table array of the SBSP, wherein the router table array includes a plurality of entries each including a destination node and an output port of the SBSP associated with the destination node.

5. The method of claim 4, further comprising setting the minimal set of routing infrastructure information between the SBSP and the one or more neighboring components.

6. The method of claim 5, wherein setting the minimal set of routing infrastructure comprises setting an entry of the router table array of a first neighboring component associated with the SBSP on a down port to route to an up port and setting an entry of the router table array of the first neighboring component associated with the target component on the up port to route to the down port.

7. The method of claim 1, wherein the BIOS does not include routing information for the system topology.

8. A system comprising:
a system bootstrap processor (SBSP) to dynamically discover a topology of the system using basic input/output system (BIOS) to communicate a link exchanged parameter with at least one component coupled to the SBSP, set a minimal set of routing infrastructure information based on the communication, wherein the minimal set of routing infrastructure information corresponds to entries of a router table array of ports of components between the SBSP and a target component on a path between the SBSP and the target component, determine presence of one or more neighboring components to the target component based on a communication from the SBSP to the target component using the minimal set of routing infrastructure information;
a second processor coupled to the SBSP processor by a first point-to-point (PTP) link;
a third processor coupled to the SBSP by a second PTP link; and
a storage coupled to the SBSP to store a discovery tree including a plurality of tree paths, each tree path including a series of path nodes from the SBSP to a target node, each path node including a tuple having a component identifier, an uplink port identifier, and a downlink port identifier.

9. The system of claim 8, wherein the SBSP includes a router table array to store a plurality of entries each including a destination node and an output port of the SBSP associated with the destination node.

10. The system of claim 9, wherein the SBSP is to set the minimal set of routing infrastructure to set an entry of the router table array of a first neighboring component associated with the SBSP on a down port to route to an up port and set an entry of the router table array of the first neighboring component associated with the target component on the up port to route to the down port.

11. The system of claim 8, further comprising a non-volatile storage to store the BIOS, wherein the BIOS does not include topology data of the system.

12. The system of claim 11, wherein the third processor comprises an input/output hub.

13. An apparatus comprising:
a first processor to dynamically discover a system topology via communication of a link exchanged parameter with at least a second processor and a third processor coupled to the first processor, form a set of routing infrastructure information based on the communication corresponding to entries of a router table array of ports of components coupled between the first processor and a target component, determine presence of one or more neighboring components to the target component based on a communication from the first processor to the target component using the set of routing infrastructure information, and to enable storage of a discovery tree including a plurality of tree paths, each tree path including a series of path nodes from the first processor to the target component, each path node including a tuple having a component identifier, an uplink port identifier, and a downlink port identifier.

14. The apparatus of claim 13, further comprising a non-volatile storage to store a basic input/output system (BIOS), wherein the BIOS does not include topology data of the system.

15. The apparatus of claim 13, wherein the link exchanged parameter includes a component identifier, a port number, and capabilities.

16. The apparatus of claim 13, wherein the entries of the router table array each include a destination node and an output port of the first processor associated with the destination node.

17. The apparatus of claim 13, wherein the first processor is to form the set of routing infrastructure to set an entry of the router table array of a first neighboring component associated with the first processor on a down port to route to an up port and set an entry of the router table array of the first neighboring component associated with the target component on the up port to route to the down port.

* * * * *